Feb. 21, 1933.  E. W. WESCOTT  1,898,702
PROCESS OF TREATING IRON ORES
Filed Feb. 16, 1928  2 Sheets-Sheet 2
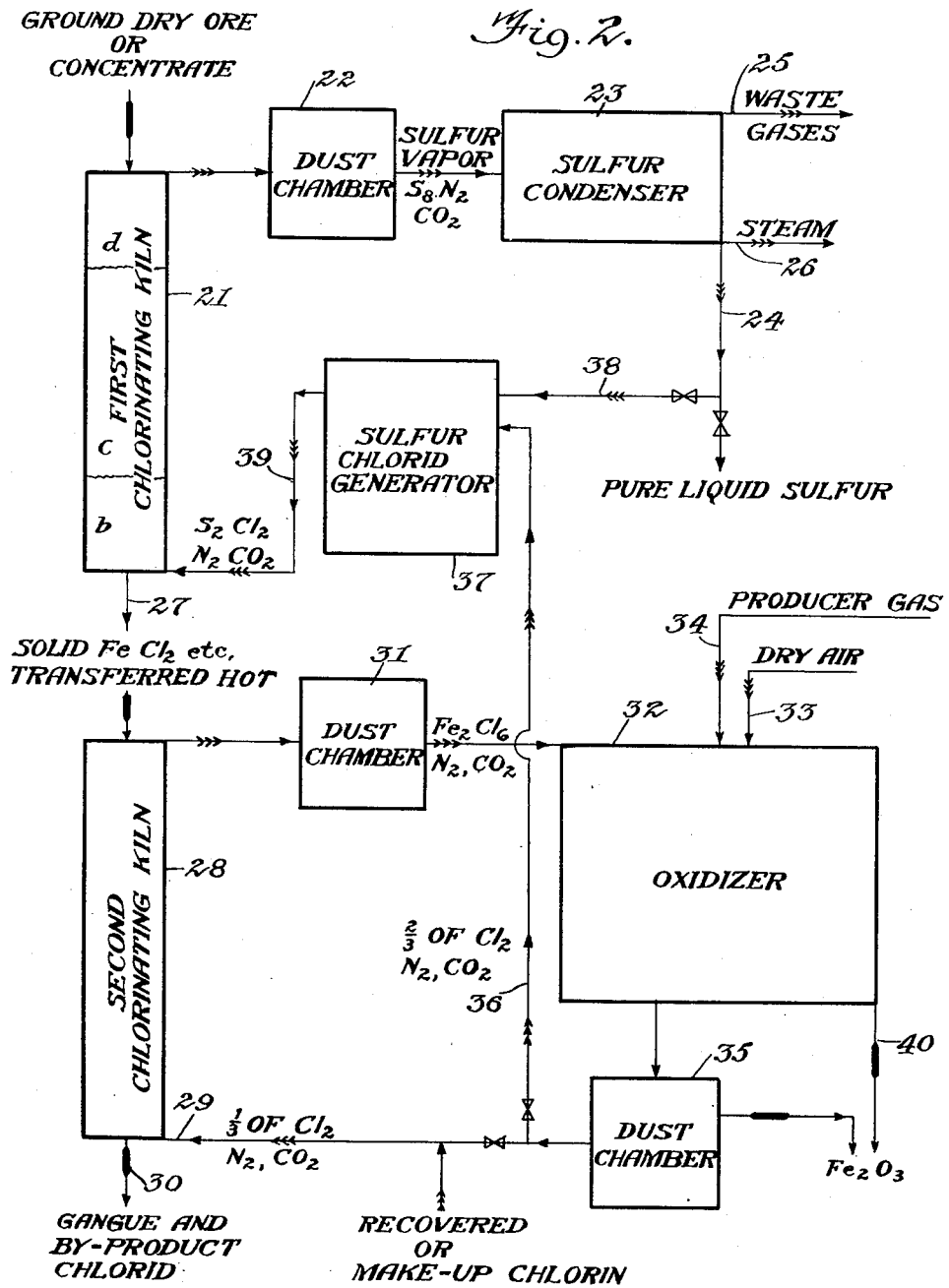

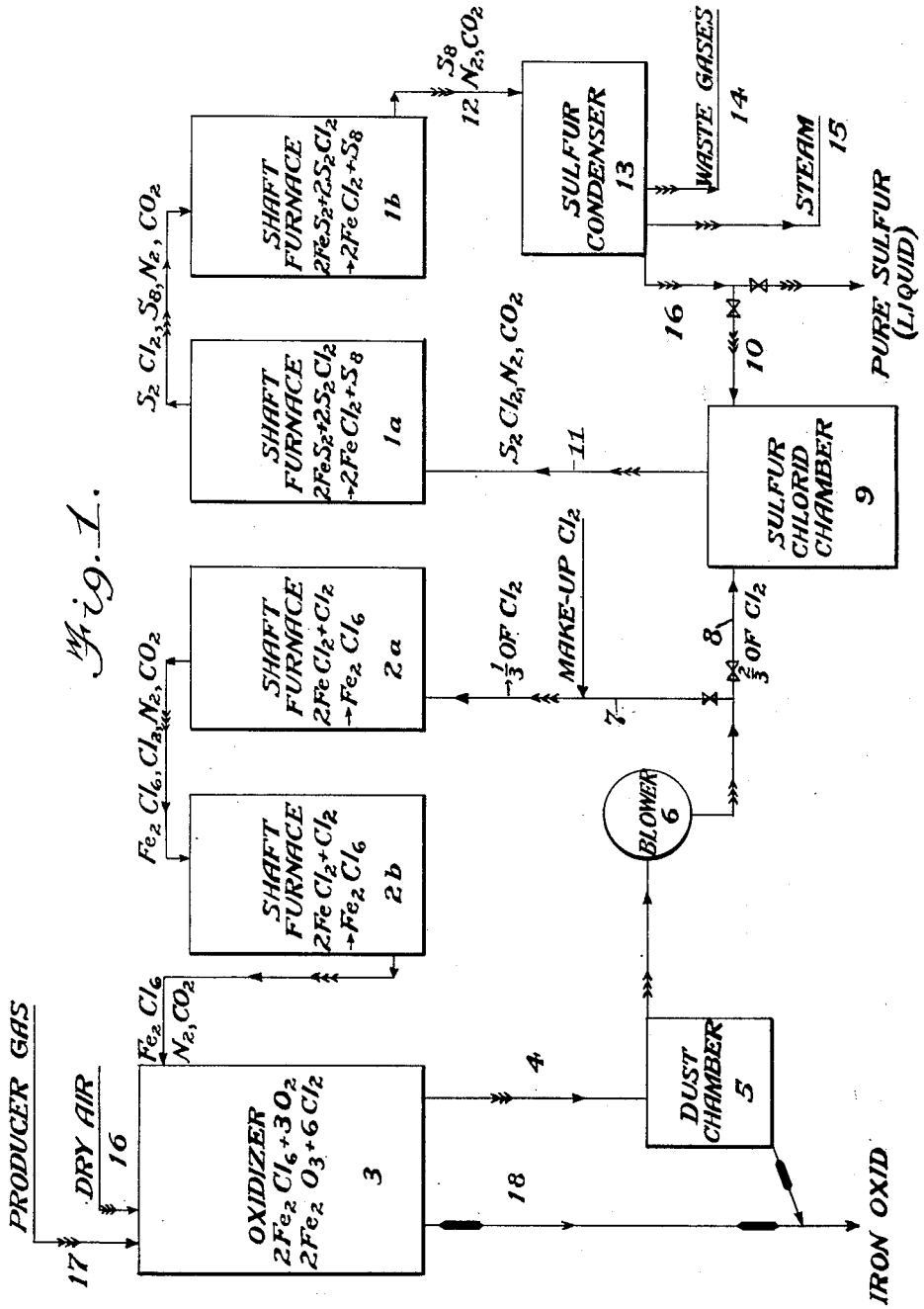

Patented Feb. 21, 1933

1,898,702

UNITED STATES PATENT OFFICE

ERNEST W. WESCOTT, OF NIAGARA FALLS, NEW YORK, ASSIGNOR, BY MESNE ASSIGNMENTS, TO SULPHIDE CORPORATION, A CORPORATION OF DELAWARE

PROCESS OF TREATING IRON ORES

Application filed February 16, 1928. Serial No. 254,805.

This invention relates to processes of treating iron ores; and it comprises a split cycle method of beneficiating iron ores, and particularly sulfid ores containing iron, with recovery of pure iron oxid, utilizing chlorin with cyclic use of said chlorin wherein dilute ferric chlorid vapors produced as hereinafter described are burnt by hot air (best in the presence of a small amount of producer gas) to produce dilute chlorin and ferric oxid, the flow of dilute chlorin produced is subdivided into a major and minor flow of approximately ⅔ and ⅓ respectively, the major flow is caused to react on an iron ore (being usually saturated with sulfur prior to contact in the case of sulfid ores) to fix the chlorin as solid ferrous chlorid and permit of removal of diluent gases from the system and the ferrous chlorid is further chlorinated by the minor flow of dilute chlorin to furnish dilute vapors of ferric chlorid, the dilute vapors of ferric chlorid being then burnt, as recited ante, to produce ferric oxid and dilute chlorin reentering the circulation; all as more fully hereinafter set forth and as claimed.

In a prior Patent No. 1,552,786, dated September 8, 1925, I have described and claimed a method of recovering iron oxid in a pure form, from iron ores with the aid of chlorin wherein the chlorin is employed in a cyclic manner and does not leave the system, being used and reused for long periods of time and on an indefinitely large amount of ore. In this process vapors of ferric chlorid are burnt by hot air as a sort of flame, giving solid iron oxid and chlorin diluted by the nitrogen of the air; the chlorin being accompanied by about twice its volume of nitrogen. This dilute chlorin is passed over hot iron ore in the presence of a reducing agent and gives a mixture of vapors of ferric chlorid with nitrogen. The ferric chlorid is condensed to allow removal of nitrogen from the system and is then revaporized and burnt with air to give dilute chlorin.

In another and copending application Serial No. 181,497, April 6, 1927, I have described and claimed a method of beneficiating sulfid ores of iron (pyrites, etc.) employing a similar chlorin cycle. In this method pyrites is treated with dilute chlorin in about the theoretical amount to form ferric chlorid. Sulphur is displaced and is vaporized, the vapors going forward in admixture with the nitrogen accompanying the chlorin. The sulfur is condensed and the nitrogen leaves the system. The ferric chlorid remaining with the ore gangue is vaporized and the vapors burnt with air to furnish dilute chlorin which re-enters the cycle. The products of the process are elemental sulfur and pure iron oxid. Any heavy metals, other than iron, remain with the gangue as fixed chlorids and often offer a valuable by-product.

In each of the described processes it will be noted that solid ferric chlorid is produced in one stage, fixing the chlorin and allowing the accompanying gaseous nitrogen to go forward to exit, and this solid chlorid is vaporized and the vapors burnt with air. In so doing the burner gases theoretically carry about one-third chlorin and two-thirds nitrogen; and this richness is closely approached in practice.

Both in the method of the acknowledged application and in that of the patent, the chlorin travels in a single closed cycle. The gaseous chlorin is fixed as solid ferric chlorid and the accompanying nitrogen is separated at this time. For this simple cycle, the present invention substitutes a more complex operation, which may be called a split cycle. Part of the dilute chlorin from the burner is fixed by iron, as before, with separation of the accompanying nitrogen, although fixation is as ferrous chlorid instead of as ferric chlorid. The remaining and smaller part of the dilute chlorin is used to convert the solid ferrous chlorid to vapors of ferric chlorid and these vapors, admixed with the nitrogen accompanying the chlorin, are sent to the burner to furnish chlorin. The resultant dilute chlorin is subdivided into a major sub-flow and a minor sub-flow; these in the case of ores carrying no other metallic values than iron having a volume ratio 2:1. In this way of operating, special vaporization of solid ferric chlorid is avoided but a somewhat more dilute chlorin is produced. Two-thirds of the nitrogen of air used in burning ferric chlorid leave the system and one-third goes back to the burner. The chlorin entering the oxidizer as ferric chlorid is equivalent in quantity in each instant to the amount of chlorin leaving the oxidizer as chlorin and is accompanied by one unit of inert gas for each three units of inert gas leaving the oxidizer at the same instant. It results from this that in the limiting case, where no other gases are present, the concentration of the chlorin coming from the oxidizer is just under 28 per cent. In practice, for reasons later appearing, I generally use a little producer gas in the oxidizer. This introduces more nitrogen and exit chlorin coming from the oxidizer runs between 20 and 24 per cent by volume.

With pyrites and other sulfids, I find it advantageous to alter the process of my copending application, Serial No. 181,497, by using chlorin in the initial stage indirectly, so to speak, rather than directly. In so doing, I may treat the major sub-flow of chlorin intended to produce ferrous chlorid with sulfur; converting it into chlorid of sulfur containing no excess of chlorin by passage over hot sulfur. This saturation of the chlorin with sulfur precludes formation of ferric chlorid in this stage of operation. The sulfur carried by the chlorin joins the sulfur liberated from the ore and goes forward to the condenser.

In the burner I further use a modicum of producer gas free of hydrogen in addition to the air, the amount of air being slightly increased to correspond. This producer gas in addition to its heating value appears to have a sort of catalytic effect upon the iron oxid produced. In its presence and at the proper temperature the iron oxid is produced as a coarsely crystalline material rather than as a fine impalpable powder.

In applying the present process to sulfid ores of iron, such as pyrites, the greater dilution of the chlorine is advantageous in facilitating displacement of sulfur as such and carrying it forward as vapor; this being particularly the case where sulfur chlorid is used for displacing rather than chlorin itself. The sulfur chlorid brings in more sulfur and greater dilution is advantageous. The less the concentration of sulfur vapor in the passing mixture of vapors and gases, the lower is the temperature at which extrication in the vapor form is possible. Within limits, the greater the dilution, the lower the temperature at which I can operate in the first stage chlorination and still completely remove sulfur as vapors. I find that dilute sulfur chlorid vapors produced by the use of a dilute chlorin containing about 22 per cent chlorin and 78 per cent nitrogen (and carbon oxids) enables me to work at a temperature in the gases at the point of exit of about 330° C. with good removal of sulfur as vapor, and with complete conversion of iron sulfid into ferrous chlorid. The exact lower limit of temperature at which I can work depends somewhat on the pressure; and at 10 pounds gage pressure, the minimum temperature is higher, being about 354° C.

In order to secure efficient operation in converting iron sulfid to ferrous chlorid by $S_2Cl_2$, I desire to have the sulfid ore crushed rather fine; say, to granules of 80 mesh, or thereabouts. With granular material between 80 and 100 mesh chlorination of the charge and removal of sulfur can be effected in about twenty hours at a temperature of 375° C., presuming good contact be effected between the solid and the vapor. Under the same conditions material between 120 and 160 mesh can be completely treated in something under nine hours. If the material is moving or subject to abrasion during chlorination the time is correspondingly shortened. The reaction itself is extremely vigorous. And the times mentioned are those required for securing penetration. It is however usually desirable not to have the action too quick in working on a charge and thereby cause local overheating. Much depends upon the particular apparatus. With a regulated feed of ore, quick action may be desirable. For example very fine material may be converted into a sort of aerosol in the passing gases; distributed fine stuff being fed down against upward passing hot dilute sulfur chlorid vapors. In the case of resting charges, fineness of the material rendered it difficult to pass gases through a charge because of frictional resistance. With a run of crusher material having the coarsest granules even as coarse as 40 mesh, and the rest finer, I find a stationary charge of any depth is too resistant to gas flow to permit completion of reaction within a reasonable period. Its imperviousness, however, can be largely obviated by the expedient of sizing the crushed material into a number of grades. Each grade separately will be found sufficiently pervious to permit a satisfactory flow of sulfur chlorid vapors therethrough, either in updraft or in downdraft. For example, a sulfid ore may be crushed in standard types of crushers down to about ¾ inch size, making a small reduction in each stage and removing fine material produced in each stage. The ¾ inch material may then be passed through successive sets of rolls with a small reduction of size in each set, with intermediate removal of material finer than 80 mesh, producing minimal amounts of fines. Operating in this way, all the material may be brought down to 80 mesh. It is thereafter split roughly into four fractions, these fractions, respectively, containing the granules between 80 and 100 mesh, between 100 and 130 mesh, between 130 and 160 mesh, and materials finer than 160 mesh. Each of the first three portions will be found sufficiently permeable to gas flow to adapt it for use in the present process. The several fractions may be separately treated, that is, as separate charges; or, in making a single charge, a layer of the finest material may be put into the reaction chamber, followed by a layer of another size and so on. The layered charge thus formed will be sufficiently permeable to permit treatment as a stationary charge. Permeability can be increased by admixing coarser sized sand with the charge. A little coarse sand in admixture is particularly desirable with the very fine material; finer than 160 mesh. With this fineness, I sometimes admix several volumes of coarse sand, or gangue. Sometimes, such a mixture is desirable in any event, where the mineral is a very pure or rich pyrite.

In rotating drums or kilns, these considerations as regards permeability do not apply.

In batch operation, I generally heat a charge of granulated material to a temperature of about 375° C. and pass sulfur chlorid vapors through the charge as long as reaction continues; that is, for some time after sulfur chlorid appears in the effluent. All the iron is thereby converted into ferrous chlorid. The pure sulfur vapors at first produced are sent to a condenser which may be, as in the acknowledged copending application, of the general type of a fire tube boiler. By regulating the steam pressure in the boiler, the condensed sulfur may be kept at the temperature range within which it is freely liquid. Towards the end of the treatment of a batch, when sulfur chlorid begins to appear in the effluent, the mixture of sulfur and sulfur chlorid vapors may be led through a new and fresh batch; or these contaminated vapors may be led to a special condenser provided for the purpose. The contaminated sulfur so produced is used in the preparation of fresh supplies of sulfur chlorid.

The operation of chlorinating granulated iron sulfid to ferrous chlorid with the aid of sulfur chlorid so far described produces a granulated ferrous chlorid with the granules of about the same size as the original ore granules. There is some swelling, but not much. It is this obviation of swelling that renders the use of sulfur chlorid more advantageous for contact with the raw ore than that of chlorin itself. Dilute chlorin applied to a pervious charge of granulated iron sulfid produces ferrous chlorid and this ferrous chlorid, by a continuance of the flow, is converted into ferric chlorid vapors which pass forward. Chlorination is then by ferric chlorid. In chlorination of iron sulfid by ferric chlorid vapors, one-third of the ferrous chlorid produced comes from the ore and two-thirds from the vapor, so that in chlorinating a charge of granulated sulfid, the granules near the point of chlorin inlet waste away and those further along the gas path increase in size. With a current of free chlorin, or with any free chlorin in the sulfur chlorid, there will be a transitory production of ferric chlorid and a migration of iron. With a resting charge, it is more difficult to maintain permeability when using chlorin than when using sulfur chlorid. But, as stated, in rotating apparatus, these considerations, do not apply.

In treating unreduced oxid ores of iron the use of sulfur chlorid is usually undesirable and the major flow of chlorin is contacted directly with a hot mixture of oxid and carbon. Or producer gas may be admixed with the chlorin. In either event the iron oxid is converted into solid ferrous chlorid; the feed of chlorin being so controlled that brown vapors of ferric chlorid do not appear in the effluent.

The hot ferrous chlorid produced in acting on either type of ore is next converted into vapors of ferric chlorid by contact with the rest of the chlorin coming from the burner; the minor flow referred to. The hot dilute chlorin is passed over the ferrous chlorid and carries the produced ferric chlorid forward with it as vapor. These vapors are sent directly to the oxidizer.

In burning ferric chlorid vapor with dry air at 700° to 800° C., the ferric oxid is produced in a finely divided form. Sometimes, this is wanted and, sometimes, not. And using somewhat dilute ferric chlorid vapors, such as just described, this tendency to production of finely divided oxid is somewhat accentuated. Where coarser oxid is desired, it may be obtained by the expedient of adding, say, 3 to 5 per cent of carbon monoxide as dry producer gas, to the burning mixture. In the presence of this small amount of producer gas, the iron oxid is produced in a coarsely crystalline form and is readily separated from the accompanying hot dilute chlorin. The use of this producer gas adds a little to the dilution of the chlorin but has no disadvantageous effect on the operations hereinbefore described. The amount added is usually such as will give a chlorin concentration between 20 and 24 per cent.

The two successive treatments of ore described may be performed in the same reaction chamber, in which event there are commonly several like chambers functioning in parallel but not in phase to give continuous operation, or each may be performed in a special chamber with intermediate transfer means for ferrous chlorid. In the accompanying illustration, I have presented flow sheets of each way of operating. In this illustration, Fig. 1 is a flow sheet showing successive operations in the same chamber; and Fig. 2 is a similar flow sheet showing different chambers for different operations.

As shown in Fig. 1, there are four vertical reaction chambers operating as two groups, 1—a, 1—b, 2—a and 2—b; the former in the stage of operations illustrated making ferrous chlorid, and the latter being for the conversion of ferrous chlorid into ferric chlorid. The chambers 1a and 1b contain granulated sulfid ore, either as a charge of like size granules or as a charge of successive layers of like size granules. Dilute chlorin made in oxidizer 3 is supplied through pipe 4 to dust chamber 5 and thence by a blower 6 supplying two gas delivery lines 7 and 8; the former taking one-third of the total of recovered chlorin and being supplied with make-up chlorin, if necessary, and the latter taking two-thirds of said total. The major, or two-thirds, flow of chlorin goes to the sulfur chlorid generator 9, where it meets hot sulfur from line 10 and is converted into sulfur chlorid vapors which pass through the conduit 11 to the reaction chamber 1—a functioning on raw ore and, after passing through it, on through chamber 1—b. In both chambers, the sulfur chlorid converts iron sulfid into granulated ferrous chlorid with liberation of vapors of sulfur. The general temperature prevailing in chambers 1—a and 1—b is usually in the neighborhood of 350° C. The two chambers 1—a and 1—b, being in series, permit complete utilization of chlorin with comparatively rapid operation.

At the stage of operations represented by the drawings, 1—b contains a fresh charge of ore and 1—a, a charge which has been so nearly completely exhausted of its sulfur that some sulfur chlorid is passed through the charge on into 1—b.

After a time, the charge in 1—a becomes completely deprived of sulfur and at this time I by-pass it, by means of valves and pipe connections (not shown), passing the stream of sulfur chlorid from 11 directly into chamber 1—b.

Sulfur vapors from 1—b go forward through the line 12 to a sulfur condenser 13, whence waste gases (nitrogen, carbon dioxid, etc.) go to waste at 14. Steam at a useful pressure leaves the condenser at 15, this condenser being of the general type of a tubular boiler. Pure sulfur leaves the condenser at 16, some of it going back into the system to sulfur chlorid generator 9.

Chambers 2—a and 2—b, at the stage illustrated, contain ore from which the sulfur has been completely removed; i. e., they represent completely finished charges like those of 1—a and 1—b. In the state indicated, therefore, they contain granulated ferrous chlorid and associated gangue, etc. The minor, or one-third, flow of chlorin enters 2—a from the pipe line 7 and passes through 2—a into 2—b in series. At the stage shown, the ferrous chlorid contained in the charge in 2—a is so nearly exhausted that some chlorin is passing through unchanged, together with ferric chlorid, into the fresher charge contained in 2—b. In 2—b, the remaining chlorin converts solid ferrous chlorid into vaporous ferric chlorid. The exit gases and vapors from 2—b, consisting of ferric chlorid, nitrogen and carbon dioxid, pass as indicated by the arrow, into the oxidizer 3, where they are met by highly heated dry air coming through line 16 and a little dry producer gas coming by line 17. The iron oxid produced in the oxidizer 3 goes, as indicated at 18, to a stock pile, being joined by small amounts of iron oxid from the dust chamber 5.

I have illustrated four chambers, but as many more may be used as may be desired. I generally have an odd chamber out of circulation, full of fresh ore and connected in line 12 to clean the gases going to sulfur condenser 13. Interposition of this chamber is desirable when the charge in 1—b approaches complete chlorination. The use of an odd chamber, capable of being cut into and out of circulation, is also desirable to avoid loss of time when the charge in 2—a becomes completely deprived of iron and it is necessary to dump the gangue with contained non-volatile chlorids and refill the chamber with fresh ore. In a general way, the operation of the chambers is such as to give a systematic rotation in such a manner that both the sulfur condenser 13 and the oxidizer 3 are always receiving gases which have passed through a sufficient depth of fresh and reactive material to effect complete reaction on the passing gases. This is particularly important with the sulfur condenser, since traces of sulfur chlorid gaining access to it may make the sulfur unmarketable. It is not so important with regard to the oxidizer, since traces of chlorin gaining access do no special harm. In securing absence of sulfur chlorid in the sulfur vapors going to the sulfur condenser, it is not however necessary that the gases at all times pass through the two reaction chambers; it is merely necessary that the gases shall have passed through a sufficient depth of fresh reactive sulfids to completely remove all sulfur chlorids.

As I ordinarily operate, a single chamber will produce sulfur free from sulfur chlorid during over one-half the time required to completely chlorinate the charge, and often for as much as 80 per cent of this time. By adjusting the rates of flow, the period during which contaminated sulfur is produced and requires cleanup by removal of chlorin therefrom in the second furnace may be as short as is desired. I often use an alternative method which requires a second sulfur condenser substituted for the "pure sulfur" condenser as soon as sulfur chlorid begins to come through, and pass the contaminated sulfur so produced to the sulfur chlorid chamber. This procedure eliminates the necessity of operating two chambers, 1—a and 1—b, in series.

The reaction chambers so far described may be of any suitable shape, size or material. A practical type of reaction chamber for use as 1—a, etc., is a cylindrical pipe of chrome steel provided with jackets for the circulation of heat controlling media. Lead is a satisfactory medium. There tends to be an excess of heat generated in the chambers in which sulfur is being displaced and a deficiency of heat in the chambers in which ferrous chlorid is being converted to ferric chlorid and volatilized. I can remedy this situation by systematically circulating a temperature equalizing fluid from the jackets of chambers 1—a and 1—b through the jackets of chambers 2—a and 2—b.

When any chamber is filled with fresh material, it is necessary that all of it be brought up to a temperature above the condensation point of sulfur before any sulfur chlorid is circulated through the furnace. I may accomplish this by preheating the ore outside the furnace, but I usually prefer to accomplish this preheating by allowing the ore to "soak" in the furnace while circulating through the temperature controlling jackets thereof hot lead from the furnaces 1—a and 1—b.

Same chamber operation, as illustrated in the flow sheet of Fig. 1, is desirable in the case of relatively coarse ores; but in the case of finer materials, such as flotation and other concentrates, which are often very fine or extremely friable ores, it is desirable to use special chambers for the special operations. Flotation concentrates sometimes give as high as 90 per cent through 200 mesh, and sometimes very friable ores, when ground to 60 or 80 mesh, give a very large percentage of material of 160 mesh or finer. The flow sheet in Fig. 2 is better adapted to this class of fines. It may, however, be used for the treatment of any dry pulverulent sulfid ore containing iron.

In Fig. 2, ground dry ore or concentrate is fed into the first chlorinating chamber, which is usually a rotary kiln, 21 wherein the sulfids are converted to chlorids with displacement of sulfur by the action of sulfur chlorid. The sulfur passes off in vapor form, together with inert gases, into and through the dust chamber 22 which is protected from cooling, and into the sulfur condenser 23 where sulfur is condensed and separated from the gases. Pure liquid sulfur is discharged through pipe line 24, stripped waste gases through line 25, and low pressure steam through line 26.

In kiln 21 there may be considered to be three successive zones. In zone $d$, incoming ore is heated up by the gases about to leave the kiln, while serving to strip from them any remaining traces of sulfur chloride. Zone $c$ is the chief reaction zone. In this zone local temperatures are difficult to measure, but they may, and frequently do, exceed those which I have elsewhere stated. An excess of temperature at this point, however, does no harm. Zone $b$ is cooler and in it the incoming sulfur chlorid, which may be at temperatures around 130° C., is heated up by the outgoing ferrous chloride, gangue, etc. This outgoing solid ferrous chlorid is transferred through line 27, without contact with the atmosphere and with minimal cooling, to a second chlorinating kiln 28, where it meets a stream of hot chlorin coming from pipe 29. This chlorin forms and volatilizes ferric chlorid. The gangue, stripped of iron but containing chlorids of copper, nickel, etc., is discharged at 30 to be treated for recovery of by-products and associated chlorin. Recovered or any make-up chlorin which may be necessary is introduced into pipe line 29. Ferric chlorid vapors formed in kiln 28 pass through dust chamber 31, which is protected from cooling, into oxidizer 32 where the ferric chlorid vapors meet hot, dry air from 33 and producer gas from 34 and burn to ferric oxid and chlorin. The exit mixture of chlorin and of inert gases from the oxidizer passes through the dust chamber 35 and is thereafter subdivided into two streams; roughly, one-third passing along the pipe 29 and the balance passing along the pipe 36 to sulfur chlorid generator 37. The sulfur chlorid generator is kept supplied with liquid sulfur from 24 via pipe 38. Vapors of sulfur chlorid, together with inert gases, pass to the first chlorinating kiln 21 via pipe 39.

The iron oxid produced in the oxidizer settles out as coarse crystals and is removed at 40. Small amounts of more finely divided iron oxid join it from the dust chamber 35. Chlorinating kilns 21 and 28 may be any type of furnace adapted to move pulverulent material in counter current to a gas stream and capable of withstanding the action of the chlorinating gases. They must also have the proper thermal characteristics. I prefer to use rotary kilns fabricated of chrome steel and provided with jackets adapted for the circulation of a heat controlling medium, preferably molten lead. There tends to be an excess of heat in kiln 21 and a deficiency of heat in kiln 28. I circulate a temperature controlling medium from the jacket of kiln 21 through the jacket of kiln 28 and back again. It is sometimes desirable to preheat the ore or the entering gases or both before passing them into kiln 21.

In treating ores, the 2:1 ratio for the subdivision of the chlorin applies only strictly when iron is the only chlorinatable metal present. When an ore contains metals forming non-volatile chlorids, such as nickel, copper, silver, etc., this must be allowed for, the major flow becoming somewhat greater than the 2:1 ratio. However, insofar as the iron itself is concerned, the 2:1 ratio is correct. And where these other metals are present and are withdrawn from the system as chlorids, a corresponding amount of make-up chlorin must be added to the circulation.

While I have more specifically described the treatment of sulfid ores, my invention, as hereinbefore indicated, also applies to the treatment of oxid ores. Under the term "sulfid ores of iron" I mean to include not only pyrites but other valuable ores wherein iron sulfid is a large constituent. My process is as applicable to artificial sulfid products, like matte, as it is to natural ores. Pyritic ores containing arsenic, such as arsenopyrite or mispickel, can be treated by my process. In so doing, arsenic chlorid goes on beyond the sulfur condenser and can be there condensed.

In treating sulfid ores by the process of the present invention, the process as a whole is thermally self-supporting. Local irregularities in temperature may be evened out by the use of jackets containing circulating liquids capable of withstanding high temperatures, such as lead.

What I claim is:—

1. In the beneficiation in the dry way of sulfid ores containing iron the process which comprises treating such a sulfid ore with dilute vapors of sulfur chlorid at a temperature sufficient to volatilize the sulfur of the ore and collecting and removing the displaced sulfur as vapor, the temperature at the point of removal being insufficient to carry forward any appreciable amount of ferrous chlorid and the amount of sulfur chlorid being insufficient to allow appearance of sulfur chlorid in the effluent sulfur vapors.

2. In the beneficiation in the dry way of sulfid ores containing iron the process which comprises treating such a sulfid ore with dilute vapors of sulfur chlorid at a temperature of about 350° C., the dilution being sufficient to carry forward liberated sulfur as vapor at about 350° C.

3. In the beneficiation in the dry way of sulfid ores containing iron the process which comprises treating such a sulfid ore with vapors of sulfur chlorid at a temperature sufficient to carry forward liberated sulfur in the vapor form, the treatment being continued until the iron sulfid is converted into ferrous chlorid and thereafter chlorinating said ferrous chlorid to ferric chlorid by chlorin at a temperature sufficient to produce said ferric chlorid in the vapor form.

4. In the beneficiation in the dry way of sulfid ores containing iron the process which comprises treating such a sulfid ore with vapors of sulfur chlorid at a temperature sufficient to carry forward liberated sulfur in the vapor form, the treatment being continued until the iron sulfid is converted into ferrous chlorid and thereafter chlorinating said ferrous chlorid to ferric chlorid by chlorin at a temperature sufficient to produce said ferric chlorid in the vapor form, burning said vapors of ferric chlorid with dry air to produce dilute chlorin, passing two-thirds of said dilute chlorin into contact with hot sulfur to form the sulfur chlorid used in the first recited step and passing the remaining third of the dilute chlorin into contact with ferrous chlorid to produce the stated ferric chlorid.

5. In the beneficiation of sulfid ores containing iron the process which comprises chlorinating the ore with hot dilute vapors of sulfur chlorid to convert the iron into ferrous chlorid free from ferric chlorid and take forward sulfur as vapors uncontaminated by ferrous chlorid to any appreciable extent, and preparing ferric chlorid vapors from the ferrous chlorid so produced.

6. In the treatment of sulfid ores containing iron, the process which comprises preparing a charge by reducing said ore to a granular form, sizing the thus reduced product into several grades of like sized granules and using like size granules as the charge, treating the ore charge prepared as aforesaid with hot recovered chlorin in amount required to convert the iron present into ferrous chlorid, treating the ferrous chlorid with another portion of hot recovered chlorin in amount required to convert it into vapors of ferric chlorid, burning these vapors to produce iron oxid and recovered chlorin, and sending the recovered chlorin back into the operation for re-use in the manner mentioned.

7. In the recovery of sulfur from sulfid ores containing iron, the process which comprises treating such an ore with vapors of sulfur chlorid containing diluting inert gas at a temperature sufficient to chlorinate the iron and produce dilute sulfur vapors and removing said sulfur vapors at a temperature below the boiling point of sulfur, whereby said vapors are obtained substantially free of metal chlorids.

8. A cyclic process for the conversion of iron sulfid into elemental sulfur and iron oxid with the aid of oxygen and chlorin which comprises first treating iron sulfid with sulfur chlorid, to form ferrous chlorid and elemental sulfur, then converting said ferrous chlorid to ferric chlorid by means of elemental chlorin, and thereafter treating said ferric chlorid with oxygen to form iron oxid and liberate elemental chlorin, and cyclically circulating said liberated elemental chlorin to form the sulfur chlorid and elemental chlorin employed in the stated two-stage conversion of the iron sulfid into ferric chlorid.

9. In a cyclic process of chlorination the steps which comprise dividing a stream of recovered chlorin containing inert gas into a major and a minor flow, fixing the chlorin in the major flow as a solid chlorid and thus separating the chlorin of said major flow from the inert gas previously accompanying it, combining the chlorin in the minor flow with part or all of said solid chlorid to produce a vaporized chlorid admixed with inert gas of said minor flow, and burning said gaseous chlorid to form a non-gaseous compound of the metal thereof and gaseous chlorin.

10. In the beneficiation of iron ores by recovering pure iron oxid therefrom with the aid of cyclically circulating chlorin, the process which comprises burning dilute ferric chlorid vapors with air to produce iron oxid and a flow of dilute chlorin, dividing said flow into major and minor sub-flows, fixing the chlorin of the major sub-flow in the form of ferrous chlorid by the action of the iron of an iron ore and leading diluent gases out of the system, further chlorinating the ferrous chlorid to vapors of ferric chlorid by the minor sub-flow and supplying the resultant mixture of vapors and nitrogen to the burning apparatus to produce therein the flow of dilute chlorin recited ante.

11. In the treatment of ores containing iron for the production of iron oxid, the process which comprises treating ore in one stage with hot recovered chlorin in amount required to convert the iron present into ferrous chlorid, treating the ferrous chlorid in a second and separate stage with another portion of hot recovered chlorin in amount required and at a temperature sufficient to convert it into vapors of ferric chlorid, burning these vapors to produce iron oxid and recovered chlorin, and sending the recovered chlorin back into the operation for re-use in the manner mentioned.

12. In the treatment of ores containing iron, the process of obtaining iron oxid which comprises chlorinating ore with a flow of dilute recovered chlorin containing nitrogen as a diluent, the amount of such chlorin being that required to convert the iron into ferrous chlorid, separating the accompanying nitrogen from the ferrous chloride produced, then treating the ferrous chlorid with a further portion of hot recovered dilute chlorin in amount sufficient to convert it into dilute vapors of ferric chlorid, burning such dilute vapors with air to produce iron oxid and recovered dilute chlorin and returning said recovered chlorin to the operation for the purposes mentioned.

13. In the treatment of ores containing iron for the production of iron oxid with cyclic use of chlorin, said chlorin being recovered and reused as dilute chlorinating gases, the steps which comprise splitting a stream of dilute recovered chlorinating gases into a major sub-flow and a minor sub-flow, treating ore with the major sub-flow to fix contained chlorin as ferrous chlorid, thereby permitting voiding of inert gas contained therein, treating the ferrous chlorid with the minor sub-flow to form ferric chlorid, and recovering the chlorin content of the ferric chlorid as dilute chlorinating gases.

14. In a cyclic process of chlorination with recovery and reuse of the chlorinating agent as a dilute gas containing inert gas, the process which comprises dividing the flow of recovered gas into two sub-flows, fixing the chlorin in the first flow by conversion into a solid chlorid, separating the accompanying diluent gases, using the other flow to further chlorinate the solid chlorid and recovering the chlorinating agent from the further chlorinated chlorid.

15. In the beneficiation of ores containing iron, the process which comprises treating such an ore in the dry way with dilute vapors of sulfur chlorid in amount sufficient to convert the iron to ferrous chlorid and at a temperature sufficient to carry forward liberated sulfur in vapor form, said temperature being below the boiling point of sulfur.

16. In the beneficiation of sulfid ores containing iron, the process which comprises treating such a sulfid ore with a gaseous chlorinating agent at a temperature sufficient to carry forward liberated sulfur in the vapor form and under conditions whereby the iron sulfid is converted into ferrous chlorid, thereafter chlorinating said ferrous chlorid to ferric chlorid by chlorin at a temperature sufficient to produce said ferric chlorid in the vapor form, burning the vapors of ferric chlorid with dry air to produce a flow of dilute chlorin, subdividing said flow into a major sub-flow and a minor sub-flow, utilizing the major sub-flow in the stated production of ferrous chlorid and sulfur vapors and passing the minor sub-flow into contact with said ferrous chlorid to produce ferric chlorid in the vapor form.

17. A cyclic process for the conversion of iron sulfid into elemental sulfur and iron oxid with the aid of oxygen and chlorin which comprises first treating iron sulfid with a dilute gaseous chlorinating agent to form ferrous chlorid and elemental sulfur, converting said ferrous chlorid to ferric chlorid by means of elemental chlorin, and treating said ferric chlorid with oxygen to form iron oxid and liberate elemental chlorin, and cyclically circulating said liberated elemental chlorin to form the dilute gaseous chlorinating agent and elemental chlorin employed in the stated two-stage conversion of the iron sulfid into ferric chlorid.

18. In the cyclic use of chlorin for recovering iron oxid from iron ores and the like, the process which comprises chlorinating such an ore with a portion of a dilute chlorinating agent to form ferrous chlorid with fixation of chlorin, removing the diluting gases, then chlorinating the ferrous chlorid to ferric chlorid with another portion of dilute chlorinating agent at such a temperature and under such conditions as to send forward the ferric chlorid as vapor admixed with the diluting gases, burning the dilute ferric chlorid vapors with air to produce iron oxid and dilute chlorin and dividing the dilute chlorin for use in the two chlorinating steps recited.

19. The process of claim 18 in which the iron ore is an oxid ore.

20. The process of claim 18 in which the iron ore is a sulfid ore.

21. The method of preventing the accumulation of inert gas in a cyclic chlorination process applied to the treatment of chlorinatable metals and their chlorinatable compounds, in which a chlorinating agent is maintained in a state of cyclic circulation in dilute gaseous form between a chlorinating zone and a chlorin-recovery zone, in which latter said agent is recovered from its combination with a metallic chlorid produced in the cycle, as dilute chlorin by air oxidation, said method comprising withdrawing a partial flow of said agent from the cycle at a point intermediate said zones while permitting the rest of said flow to continue in cyclic circulation between said zones, fixing the chlorin in said partial flow as a solid metal chlorid and voiding the accompanying diluent gases, then introducing said solid chlorid into said chlorinating zone and reacting it with dilute recovered chlorin coming from said chlorin-recovery zone, thereby converting the solid chlorid into dilute gaseous form.

In testimony whereof, I have hereunto affixed my signature.

ERNEST W. WESCOTT.